(12) United States Patent
Truckor et al.

(10) Patent No.: US 6,514,022 B2
(45) Date of Patent: Feb. 4, 2003

(54) LOAD RESTRAINING DEVICE HAVING SECUREMENT APPARATUS

(75) Inventors: Roger J. Truckor, Swanton, OH (US); Gary A. Beale, Toledo, OH (US)

(73) Assignee: The Andersons Agriservices, Inc., Champaign, IL (US)

(*) Notice: Subject to any disclaimer, the term of this patent is extended or adjusted under 35 U.S.C. 154(b) by 2 days.

(21) Appl. No.: 09/883,781

(22) Filed: Jun. 18, 2001

(65) Prior Publication Data

US 2002/0192046 A1 Dec. 19, 2002

(51) Int. Cl.[7] .................................................. B60P 7/14
(52) U.S. Cl. ........................ 410/138; 410/130; 410/132; 410/137; 410/139
(58) Field of Search ................................ 410/129, 130, 410/132, 133, 134, 135, 137, 138, 139, 141, 142

(56) References Cited

U.S. PATENT DOCUMENTS

| | | | | |
|---|---|---|---|---|
| 3,550,538 A | * | 12/1970 | Geyer | 410/134 |
| 3,680,492 A | * | 8/1972 | Weage | 410/129 |
| 3,804,029 A | * | 4/1974 | Williams | 410/139 |
| 4,494,896 A | * | 1/1985 | DiFranco | 410/148 |
| 4,842,459 A | * | 6/1989 | Jensen et al. | 410/97 |
| 5,472,300 A | * | 12/1995 | Lipschitz | 410/139 |
| 6,017,175 A | * | 1/2000 | Kassab et al. | 410/131 |
| 6,179,535 B1 | * | 1/2001 | Bouchard | 410/131 |
| 6,247,740 B1 | * | 6/2001 | Smith | 296/24.1 |

OTHER PUBLICATIONS

Advertisement entitled "Load Restraint Device (LRD) Swing–Away Bulkhead", 1999, The Andersons, Inc., U.S.A.
Advertisement entitled "Product Protection Systems", at least as early as 1999, Holland, U.S.A.
Adverstisement from "Progressive Railroading", at least as early as 1999, p. 132, Progressive Railroading, U.S.A.
Advertisement from "Railway Age", Dec. 2000, p. 62, Railway Age, U.S.A.

* cited by examiner

Primary Examiner—D. Glenn Dayoan
Assistant Examiner—Paul Chenevert
(74) Attorney, Agent, or Firm—Emch, Schaffer, Schaub & Porcello Co., L.P.A.

(57) ABSTRACT

A load restraining device having a securement apparatus for a railway boxcar including a restraining member with a top section. The device includes a first pin and a second pin being positioned adjacent to the top section. The device includes a securing member having a first end positioned adjacent to the first pin and a second end positioned adjacent to the second pin. The securing member prevents the inadvertent removal of the pins from the device.

9 Claims, 7 Drawing Sheets

LOAD RESTRAINING DEVICE HAVING SECUREMENT APPARATUS

BACKGROUND OF THE INVENTION

The present invention relates generally to a load restraining device or bulkhead. More specifically, the invention is directed to a load restraining device having a securement or locking apparatus for ensuring the safe use of the device.

In the past, load restraining devices have been used in railway boxcars to protect freight from being damaged while in transit. The load restraining devices are positioned in the boxcars between two opposed walls. The load restraining devices are attached to the walls by removable pins. It has been found that the inadvertent removal of pins can result in a load restraining device falling onto a worker handling the device. There is a need for a load restraining device that includes, among other things, a securement or locking apparatus that prevents the inadvertent removal of pins from the device. The present invention satisfies this need.

SUMMARY OF THE INVENTION

The present invention is a load restraining device having a securement apparatus including, among other things, a restraining member having a top section. The device includes a first pin and a second pin being positioned adjacent to the top section. The device further includes a securing member having a first end positioned adjacent to the first pin and a second end being positioned adjacent to the second end. The securing member prevents the inadvertent removal of the first and second pins from the device.

It is the primary object of the present invention to provide a load restraining device having a securement apparatus for preventing the inadvertent removal of pins from the device.

Other objects and advantages of the present invention shall become apparent to those skilled in the art upon a review of the following detailed description of the preferred embodiments and the accompanying drawings.

DETAILED DESCRIPTION OF THE PREFERRED EMBODIMENTS

Figure 1:
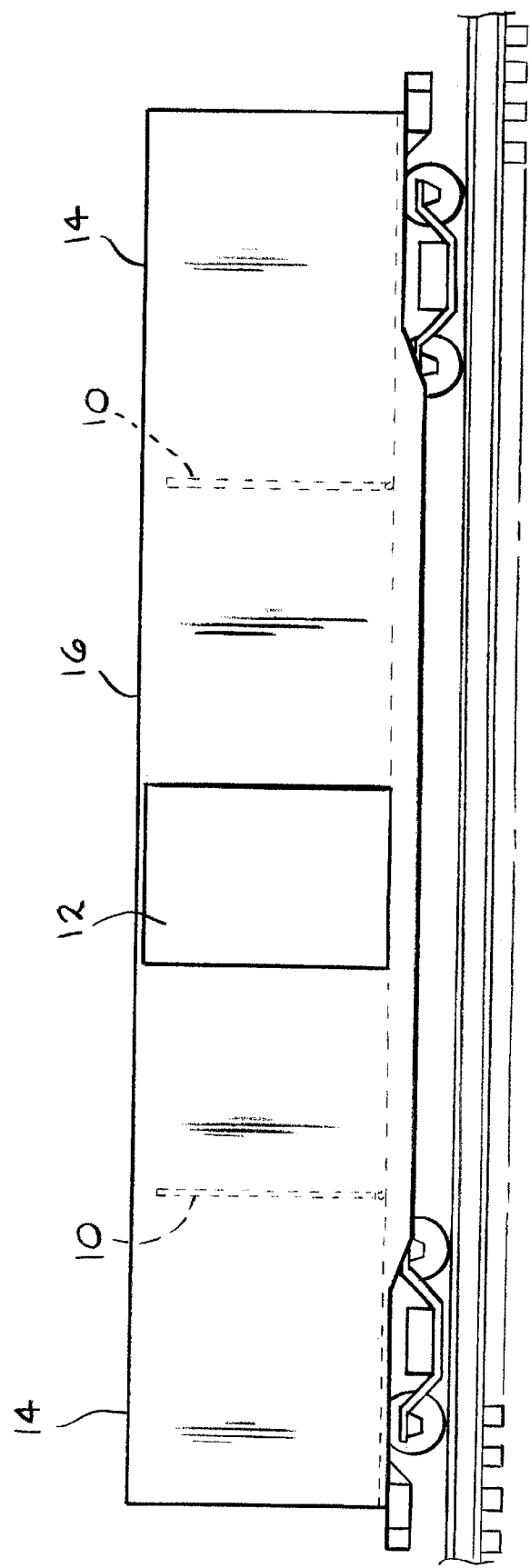
FIG. 1 is a side elevational view of a boxcar showing in broken lines the positioning of load restraining devices according to the present invention.

The preferred embodiments and best mode of the present invention will now be described in detail with reference being made to the drawings. In the drawings, the load restraining device according to the present invention is indicated generally by the reference number "10".

Figure 2:
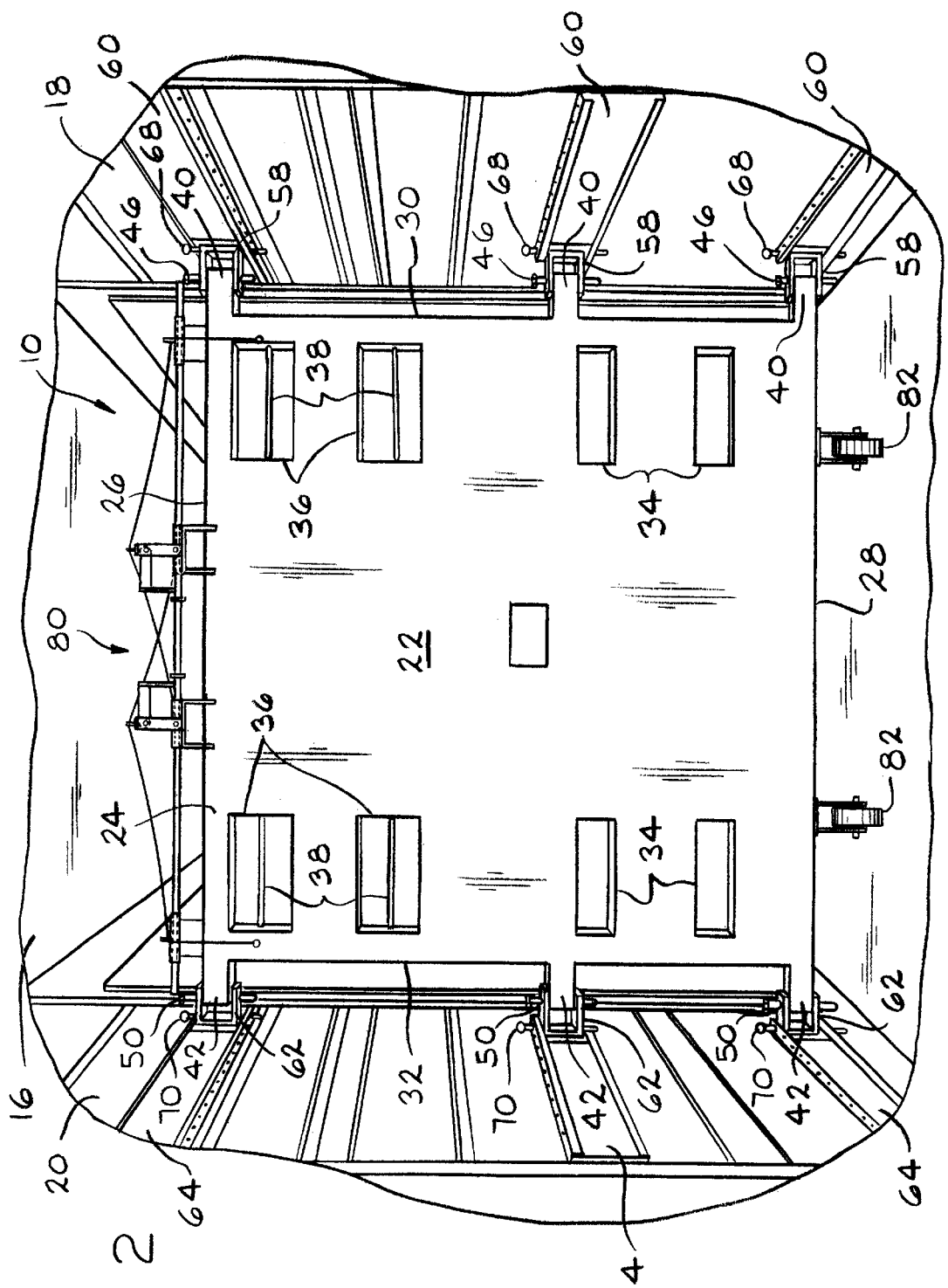
FIG. 2 is a perspective view of a load restraining device according to the present invention positioned between two opposed walls of a boxcar.
Figure 3:
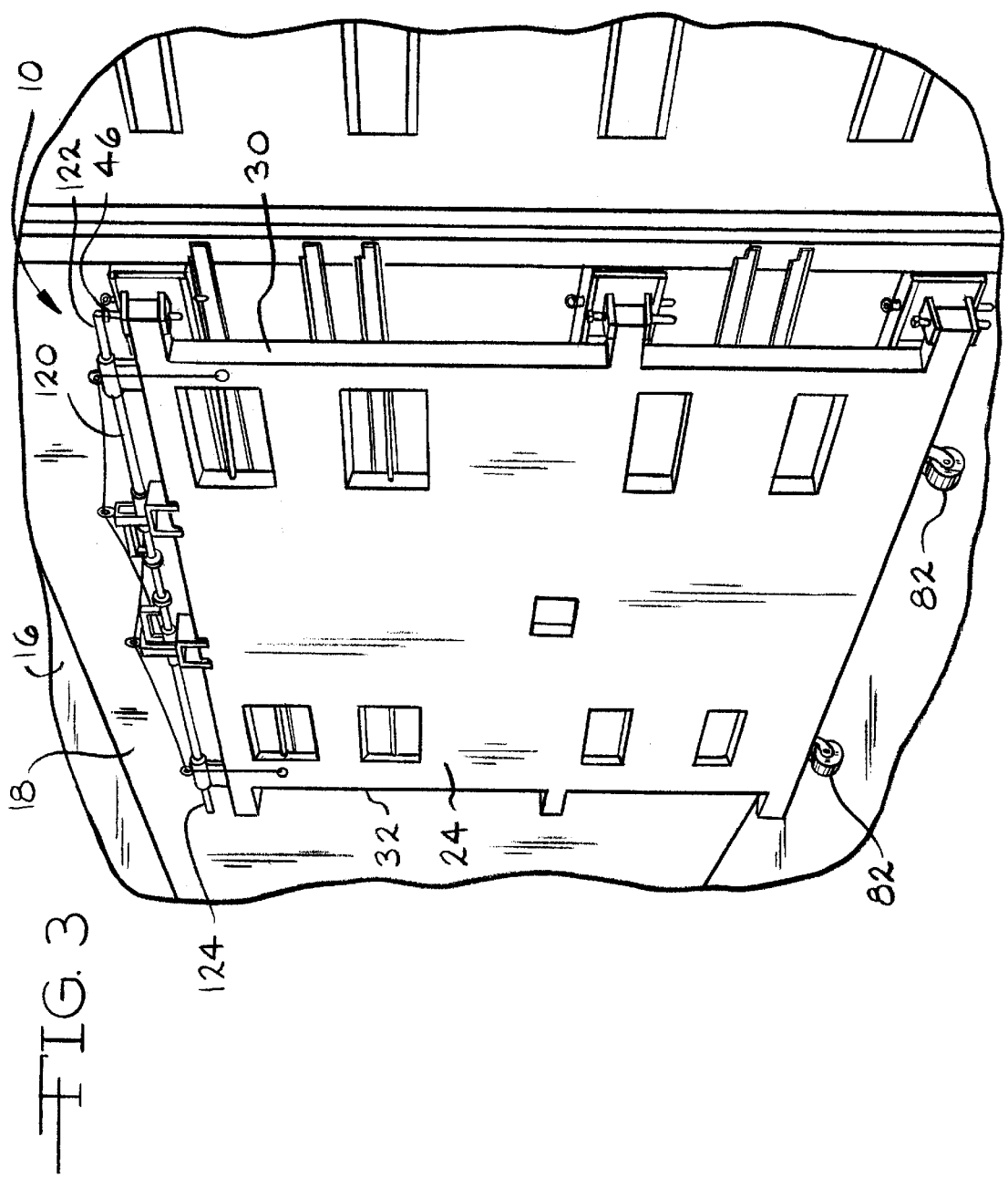
FIG. 3 is a view similar to the view of FIG. 2 showing the load restraining device positioned against one of the walls of the boxcar.

Referring to FIGS. 1–3, the load restraining devices 10 are installed between a door opening 12 and the ends 14 of a boxcar 16. When the boxcar 16 is being loaded at the ends 14, the load restraining devices 10 are positioned in the boxcar 16 as shown in FIG. 3. When the ends 14 have been loaded, the load restraining devices 10 are positioned in the boxcar 16 as shown in FIGS. 1 and 2. The space between the load restraining devices 10 adjacent to the door opening 12 is then loaded.

Referring to FIG. 2, the load restraining device 10 is shown secured to a first wall 18 and a second opposed wall 20 of a boxcar 16. The load restraining device 10 includes a cover or skin 22 that is mounted on the opposed sides of an internal frame (not shown). A preferred embodiment for the cover 22 is an American Society for Testing Materials (ASTM) A36 steel plate having a thickness of 10 gauge. Preferably, the internal frame is constructed of ASTM A36 steel. The ASTM A36 materials are preferred for added strength when high impacts occur in the boxcar 16.

The cover 22 forms a load restraining member 24 having a top section 26, a bottom section 28, a first side 30 and a second side 32. The load restraining member 24 includes vertical ladder openings 34 adjacent to the bottom section 28 and hand openings 36 having horizontal support bars 38 positioned adjacent to the top section 26. A worker can climb the ladder openings and grasp the horizontal support bars 38 during the handling of the load restraining device 10.

Figure 4:
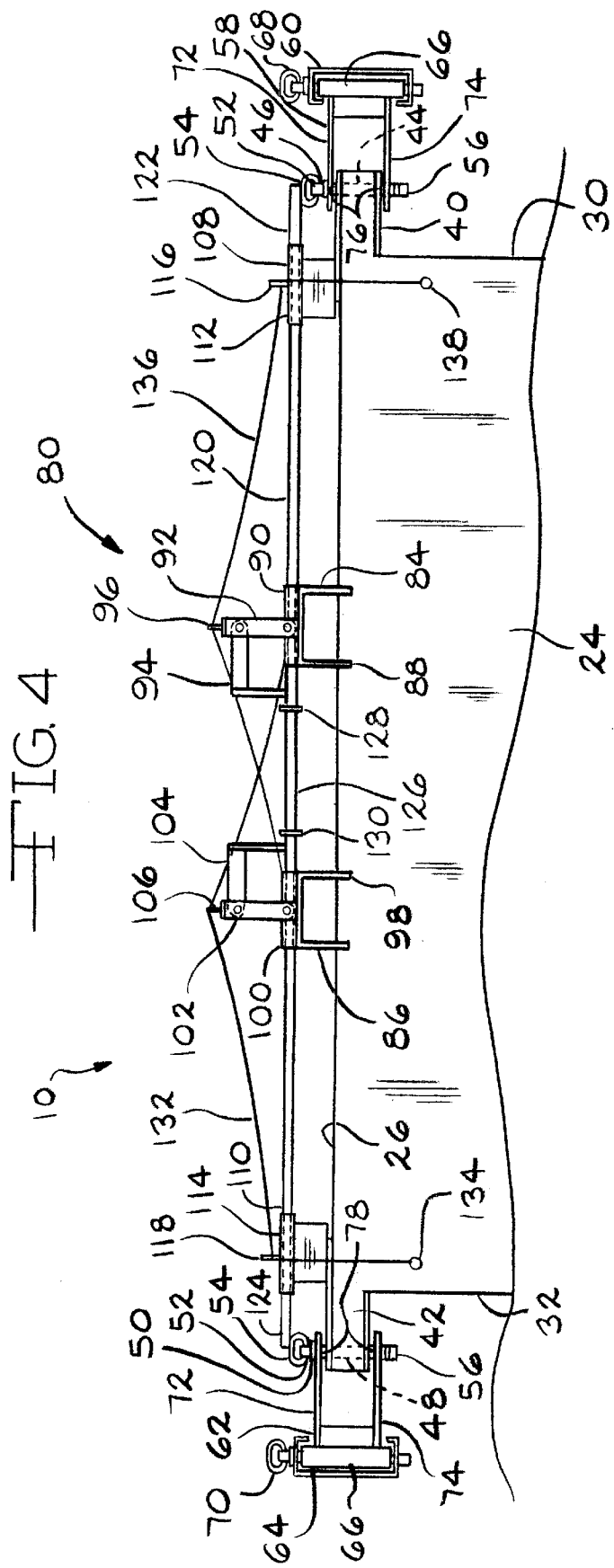
FIG. 4 is a detailed view of the securement apparatus according to the present invention in which the securing member is in a first position.

Still referring to FIG. 2, the load restraining device 10 includes three first horizontal members 40 positioned on the first side 30. Three second horizontal members 42 are positioned on the second side 32. As shown in FIGS. 2 and 4, each of the first horizontal members 40 includes a first pin opening 44 for receiving a first pin 46. Each of the second horizontal members 42 includes a second pin opening 48 for receiving a second pin 50. As shown in FIG. 4, each of the first and second pins 46 and 50 includes a head 52 having a ring 54 and a stem 56.

Referring to FIGS. 2 and 4, the load restraining device 10 includes three first brackets 58 moveably mounted in first horizontal guide channels 60 on the first wall 18 of the boxcar 16. Three second brackets 62 are moveably mounted in second horizontal guide channels 64 on the second wall 20. The first and second horizontal guide channels 60 and 64 extend longitudinally along their respective walls 18 and 20. As shown in FIG. 4, each of the first and second brackets 58 and 62 includes a base 66 that is received by and slides along a respective one of the horizontal guide channels 60 or 64. A first bracket pin 68 pivotally mounts the base 66 of the first bracket 58 in the first horizontal guide channel 60. A second bracket pin 70 pivotally mounts the base 66 of the second bracket 62 in the second horizontal guide channel 64. Each of the first and second brackets 58 and 62 includes a pair of aligned arms 72 and 74 that are connected to and extend outwardly from the base 66. Each of the arms 72 and 74 of the first bracket 58 includes a first bracket opening 76 for receiving the first pin 46. Each of the arms 72 and 74 of the second bracket 72 includes a second bracket opening 78 for receiving the second pin 50. When the first bracket openings 76 are in alignment with the first pin openings 44 of the first horizontal members 40, the first pins 46 can be inserted through the respective openings to pivotally attach the load restraining member 24 to the respective first brackets 58. Similarly, the second pins 50 can be inserted through the respective openings to pivotally attach the load restraining member 24 to the respective second brackets 62

As shown in FIG. 2, the load restraining device 10 has a securement apparatus 80, as described below, positioned on the top section 26. The device 10 further includes a pair of wheels 82 positioned on the bottom section 28. The wheels 82 are used during the positioning of the load restraining member 24 as shown in FIG. 3. The wheels 82 allow one worker to move and pivot the load restraining member 24 against, for example, the first wall 18 of the boxcar 16.

Figure 7:
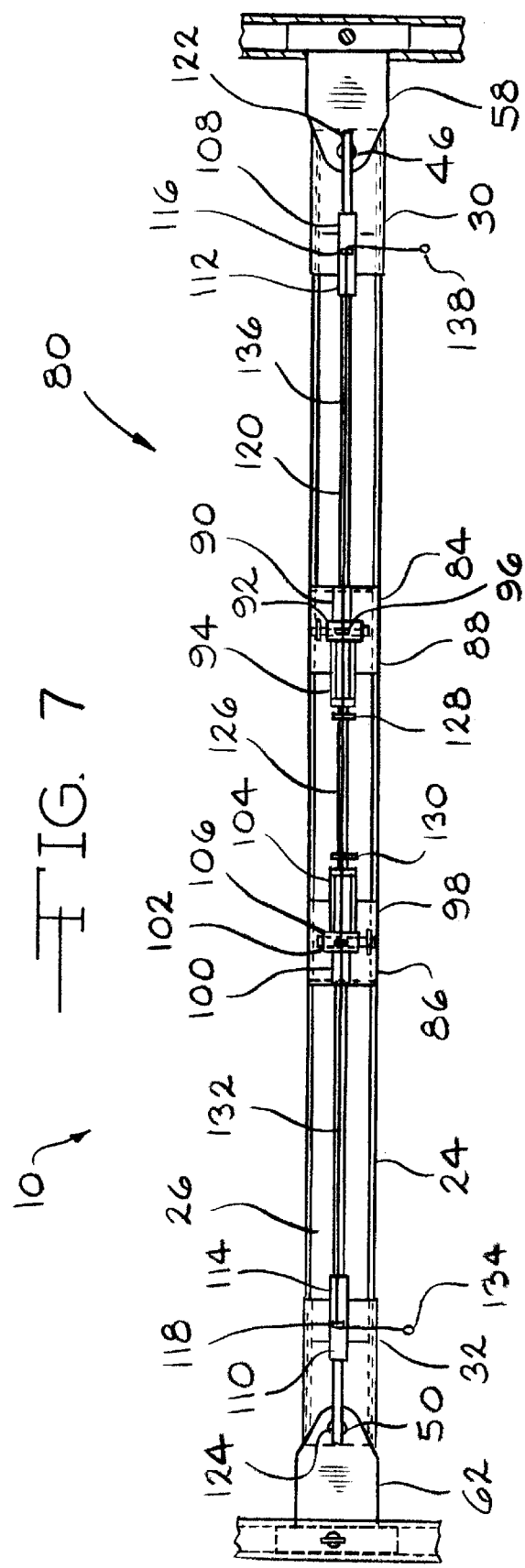
FIG. 7 is a top view of the securement apparatus according to the present invention.

Referring to FIGS. 4 and 7, the securement apparatus 80 includes a first locking device 84 and a second locking device 86 positioned on the top section 26 of the load restraining member 24. The first locking device 84 includes a first base member 88 fixedly attached to the load restraining member 24, a first channel 90 positioned on the first base member 88, a first post 92 that extends vertically and upwardly with respect to the first base member 88 and a first latch 94 pivotally mounted on the first post 92. A first eyelet guide 96 is positioned on the top of the first post 92. Similarly, the second locking device 86 includes a second base member 98, a second channel 100, a second post 102, a second latch 104 and a second eyelet guide 106.

Still referring to FIGS. 4 and 7, the securement apparatus 80 includes a first support member 108 mounted on the top section 26 at the first side 30 of the load restraining member 24. A second support member 110 is mounted on the top section 26 on the second side 32. The first support member 108 includes a first support member channel 112 and the second support member 110 includes a second support member channel 114. The first support member 108 includes a first support member eyelet guide 116 and the second support member 110 includes a second support member eyelet guide 118.

Still referring to FIGS. 4 and 7, the securement apparatus 80 includes a securing member 120 that includes a first end 122, a second end 124 and a center portion 126. The first end 122 of the securing member 120 is positioned in the first support member channel 112, the second end 124 is positioned in the second support member channel 114 and the center portion 126 is positioned in the first and second channels 90 and 100 of the first and second locking devices 84 and 86. The securing member 120 is movably and reciprocally mounted within the respective channels 90, 100, 112 and 114. The center portion 126 of the securing member 120 includes a first projection 128 positioned adjacent to the first locking device 84 and a second projection 130 positioned adjacent to the second locking device 86.

Figure 5:
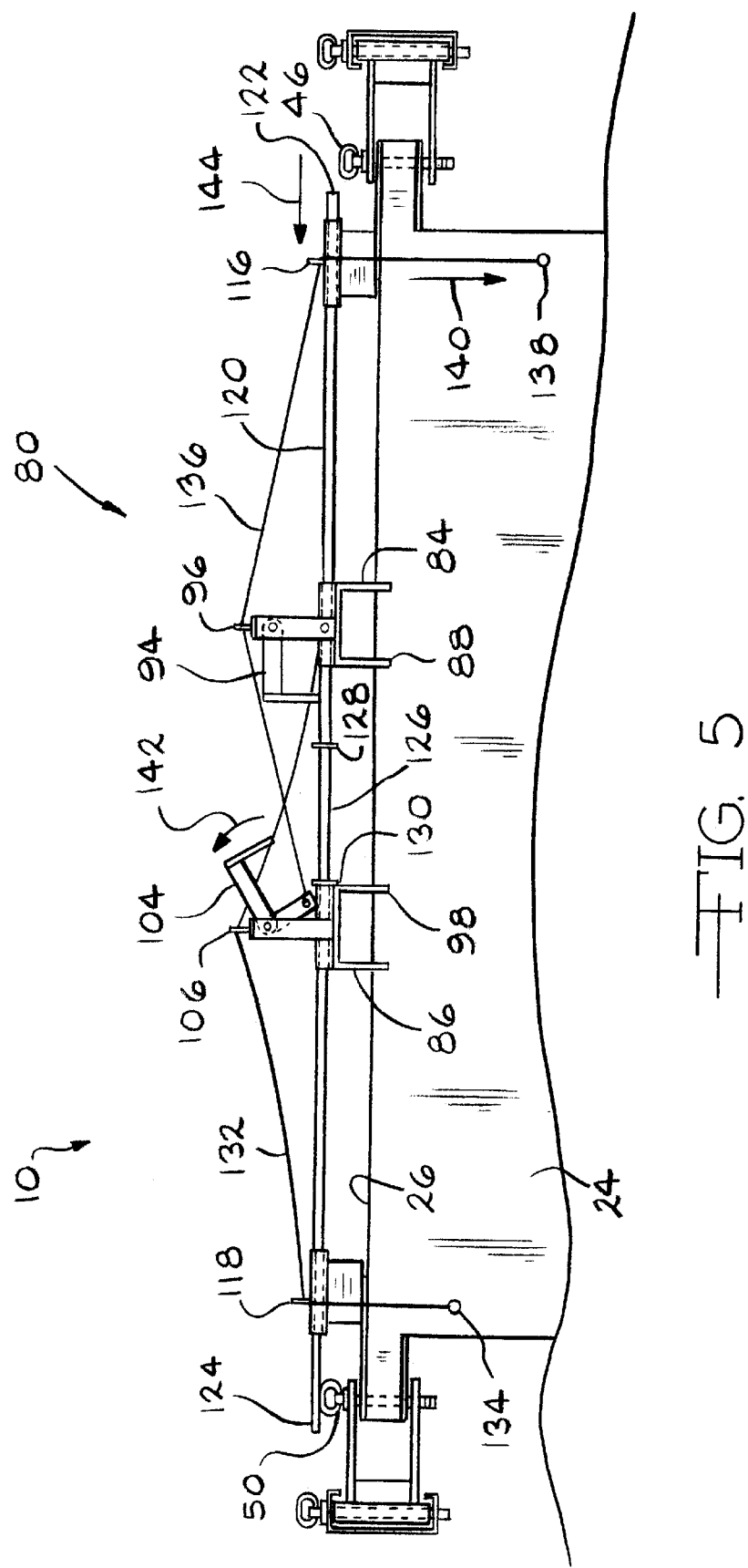
FIG. 5 is a view similar to the view of FIG. 4 in which the securing member is in a second position.

As shown in FIGS. 4, 5 and 7, the securement apparatus 80 includes a first cable 132 that is attached to the first latch 94 of the first locking device 84. The first cable 132 extends through the second eyelet guide 106 and the second support member eyelet guide 118. The first cable 132 includes a first cable end 134 that can be handled by a worker to actuate the first latch 94. A second cable 136 is attached to the second latch 104 of the second locking device 86. The second cable 136 extends through the first eyelet guide 96 and the first support member eyelet guide 116. The second cable 136 includes a second cable end 138 that can be handled to actuate the second latch 104.

Figure 6:
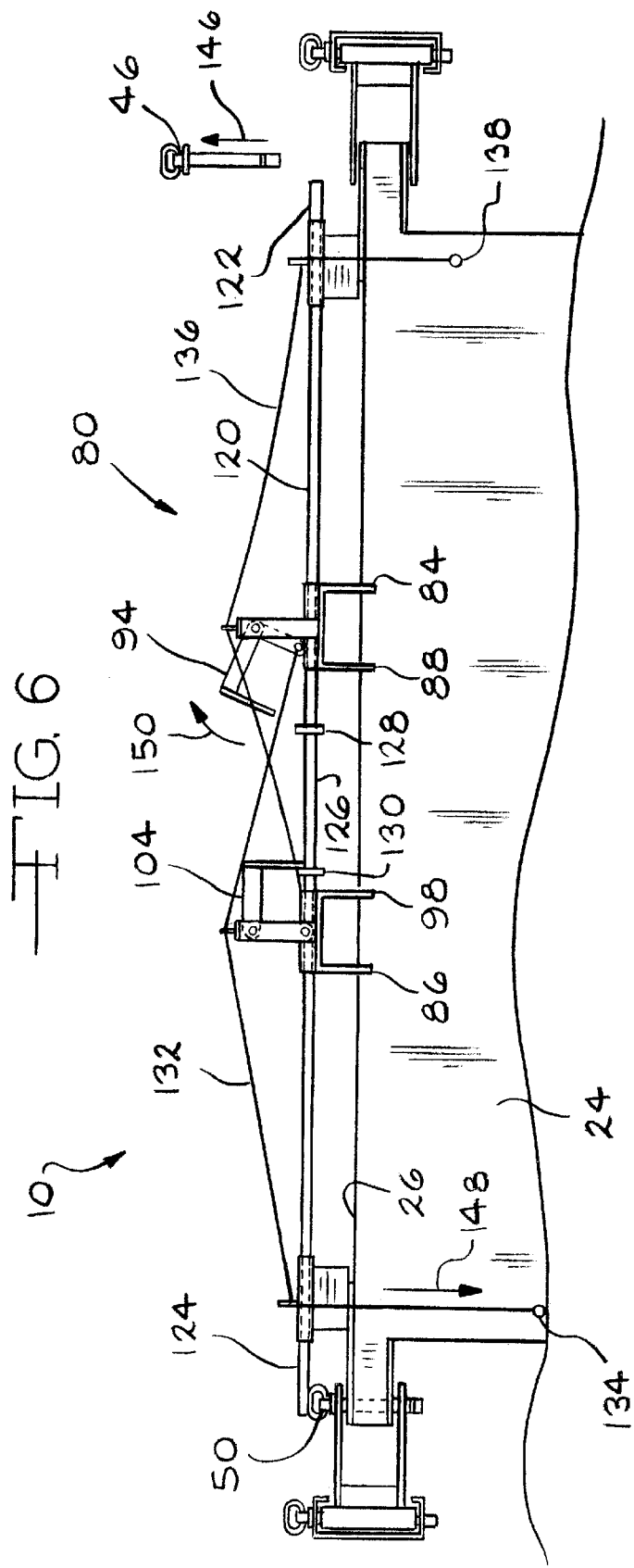
FIG. 6 is a view similar to the view of FIG. 5 showing the removal of a pin from the device.

Referring to FIGS. 4–6, the operation of the securement apparatus 80 of the load restraining device 10 will be described. As shown in FIGS. 4 and 7, the securing member 120 is in a first position in which the first end 122 is positioned over the first pin 46 and the second end 124 is positioned over the second pin 50. The first and second projections 128 and 130 are positioned between the first and second latches 94 and 104 to restrict movement of the securing member 120. In the first position, neither the first pin 46 nor the second pin 50 can be removed from the load restraining device 10. This secures or locks the first and second pins 46 and 50 in place.

As shown in FIG. 5, the second cable 136 can be moved by a worker in the direction indicated by arrow 140 to cause the second latch 104 of the second locking device 86 to pivotally move in the direction indicated by arrow 142. This allows the securing member 120 to be moved by the worker in the direction indicated by arrow 144 because the projection 130 can move past the second latch 104 until the projection 130 engages the second base 98. As shown in FIG. 5, the securing member 120 is in a second position in which the first end 122 is spaced from the first pin 46 and the second end 124 is positioned over the second pin 50.

As shown in FIG. 6, the first pin 46 can be moved in the direction indicated by arrow 146 to remove the first pin 46 from the load restraining device 10. When the second cable 136 is released, the second latch 104 moves downwardly to secure the second projection 130 between the second latch 104 and the second base member 98 of the second locking device 86. This secures or locks the securing member 120 in the second position shown in FIG. 6. If the worker moves the first cable 132 in the direction indicated by arrow 148 in an attempt to move the second end 124 of the securing member away from the second pin 50, the first latch 94 will move in the direction indicated by arrow 150. However, the securing member 120 will be unmovable because of the positioning of the second projection 130 between the second latch 104 and the second base member 98. As it will be appreciated, this prevents the inadvertent removal of a top pin, for example second pin 50, from one side of the load restraining member 24 if the opposed top pin has been removed from the other side of the device 10.

Referring to FIG. 3, the removal of all of the pins from one side of the device 10 will allow the load restraining member 24 to be pivotally moved against a wall of the boxcar. For example, the removal of the second pins 50 along the second side 32 will allow for the positioning of the load restraining member 24 against the second wall 18 of the boxcar 16. As shown in FIG. 3, the securing member 120 is in a third position in which the first end 122 is positioned over the first pin 46 and the second end 124 is spaced from the second pin 50 (not shown in FIG. 3) to allow for the removal of the second pin 50.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A load restraining device comprising:
   a restraining member having a top section;
   a first pin and a second pin being positioned adjacent to said top section; and
   a securing member being movably mounted above said top section, said securing member having a first end positioned adjacent to said first pin and a second end positioned adjacent to said second pin.

2. The load restraining device of claim 1, wherein said restraining member includes a first side and a second side, said first side including a first horizontal member having a first pin opening for receiving said first pin, and said second side including a second horizontal member having a second pin opening for receiving said second pin.

3. The load restraining device of claim 2, wherein said load restraining device further includes a first bracket movably mounted on a first wall adjacent to said first horizontal member, said first bracket having a first bracket opening for receiving said first pin, and a second bracket movably mounted on a second wall adjacent to said second horizontal member, said second bracket having a second bracket opening for receiving said second pin.

4. The load restraining device of claim 1, wherein said restraining member includes a bottom section, at least one wheel being positioned adjacent to said bottom section.

5. The load restraining device of claim 1, wherein each of said first and second pins include a head having a ring.

6. The load restraining device of claim 1, wherein said securing member being movable from a first position in which said first and second ends of said securing member are positioned over said first and second pins, respectively, a second position in which said first end is spaced from said first pin and said second end is positioned over said second pin and a third position in which said first end is positioned over said first pin and said second end is spaced from said second pin.

7. The load restraining device of claim 1, wherein said load restraining device further including a first locking device positioned on said top section having a first latch and a second locking device position on said top section having a second latch, said securing member having a first projection for engagement with said first latch and a second projection for engagement with said second latch.

8. The load restraining device of claim 7, wherein each of said first and second latches being pivotally mounted on said first and second locking devices, respectively.

9. The load restraining device of claim 8, wherein said first latch is operatively connected to a first actuation member and said second latch is operatively connected to a second actuation member.

* * * * *